United States Patent
Aaltonen et al.

(10) Patent No.: US 7,751,837 B2
(45) Date of Patent: Jul. 6, 2010

(54) METHOD AND SYSTEM FOR PROCESSING A MESSAGE

(75) Inventors: Janne Aaltonen, Turku (FI); Ismo Antikainen, Masala (FI)

(73) Assignee: CVON Innovations Limited, London (GB)

(*) Notice: Subject to any disclaimer, the term of this patent is extended or adjusted under 35 U.S.C. 154(b) by 0 days.

(21) Appl. No.: 12/019,415

(22) Filed: Jan. 24, 2008

(65) Prior Publication Data

US 2008/0254770 A1    Oct. 16, 2008

(30) Foreign Application Priority Data

Apr. 11, 2007 (GB) ................................ 0707023.8

(51) Int. Cl.
- *H04L 12/58* (2006.01)
- *H04W 4/00* (2009.01)
- *H04M 1/24* (2006.01)
- *H04M 11/00* (2006.01)
- *H04M 15/00* (2006.01)

(52) U.S. Cl. ............... 455/466; 455/412.1; 379/1.01; 379/1.02; 379/88.13; 379/114.05

(58) Field of Classification Search ............... 455/466, 455/421.1
See application file for complete search history.

(56) References Cited

U.S. PATENT DOCUMENTS

| | | | |
|---|---|---|---|
| 7,149,537 B1 * | 12/2006 | Kupsh et al. ............... | 455/466 |
| 2004/0054576 A1 | 3/2004 | Kanerva et al. | |
| 2004/0136358 A1 | 7/2004 | Hind et al. | |

FOREIGN PATENT DOCUMENTS

| | | |
|---|---|---|
| EP | 1 408 705 A1 * | 4/2004 |
| EP | 1 677 475 A1 | 7/2006 |
| WO | WO 03/049461 A2 | 6/2003 |
| WO | WO2006/016189 | 2/2006 |
| WO | WO2006/040749 | 4/2006 |
| WO | WO 2006/040749 A1 * | 4/2006 |

OTHER PUBLICATIONS

European Search Report dated May 28, 2008 for European Application No. 08153256.6—2416.

(Continued)

*Primary Examiner*—Nick Corsaro
*Assistant Examiner*—Huy C Ho
(74) *Attorney, Agent, or Firm*—Barnes & Thornburg LLP

(57) ABSTRACT

A method and system are provided for processing a message, which is being delivered from one mobile network to another. A request to send routing instructions of the message to a store-and-forward center of a transmitting mobile network is received at a moderator server of a receiving mobile network. The routing instructions are generated in the moderator server, so that the routing instructions instruct the store-and-forward center to route the message to a gateway server of the receiving mobile network. The routing instructions are transmitted from the moderator server to the store-and-forward center. Then the message, which has been sent according to the routing instructions from the store-and-forward center of the transmitting mobile network, is received at the gateway server. From the gateway server the message is forwarded for modifying and archiving purposes of the message.

33 Claims, 3 Drawing Sheets

OTHER PUBLICATIONS

International Search Report dated Jun. 19, 2008 for International Application No. PCT/EP2008/052658.
Written Opinion of the International Searching Authority dated Jun. 19, 2008 for International Application No. PCT/EP2008/052658.
International Preliminary Report on Patentability dated Oct. 22, 2009 for related International Application No. PCT/EP2008/052658.
Examination Report dated Dec. 8, 2009 for related European Patent Application No. 08153256.6.

* cited by examiner

METHOD AND SYSTEM FOR PROCESSING A MESSAGE

This application is U.S. Patent Application that relies for priority under 35 U.S.C. 119, on Application Ser. No. GB0707023.8, filed on Apr. 11, 2007 which is incorporated herein by reference.

FIELD OF THE INVENTION

The present invention relates generally to mobile communication networks and particularly to a method and system for processing a message.

BACKGROUND OF THE INVENTION

Sending messages in mobile communication networks is a widely used and popular service. For example, mainstream messaging types in the GSM (Global System for Mobile Communications) network are SMS (Short Message Service) and MMS (Multimedia Messaging Service) messages. Messages are typically sent and received with mobile terminals such as a mobile phone or a PDA (Personal Digital Assistant). Mobile communication networks can also be used to send and receive other type of messages, including electronic mail messages, voice messages, video messages, picture messages and text messages. When a mobile terminal user sends a message to another mobile terminal user within a mobile network of the same network operator, the message is typically first delivered via a base station to a store-and-forward center of the mobile network. The store-and-forward center forwards the destination address of the message to a subscriber location database which then returns routing instructions of the message to the store-and-forward center. The message is then delivered according to the routing instructions to the recipient via a specific base station.

If the recipient is beyond the reach of the mobile network, the store-and-forward center stores the message. The store-and-forward center has a time limit for how long it will store the message and thus it is suitable for short-term storing only. Subscribers can usually specify a shorter time limit if they want. The subscriber location database informs the store-and-forward center when the recipient is reachable and then the store-and-forward center delivers the message to the recipient.

The situation is more complex when a sender and a recipient of a message are subscribers of mobile networks of different network operators. In this case a store-and-forward center of the transmitting mobile network forwards the destination address of the message to a subscriber location database of the receiving mobile network. The database returns routing instructions and then the message is delivered according to the routing instructions from the transmitting mobile network to the recipient through a specific base station of the receiving mobile network. Typically the network operator of the transmitting mobile network has to pay a so-called termination fee to the network operator of the receiving mobile network.

In this kind of communication arrangement, i.e. where mobile terminal users are subscribers of mobile networks of different network operators, a message cannot be stored, not even temporarily, in the mobile network of the network operator of the recipient. In addition, it is not possible to modify a message in the receiving mobile network, for example by adding information such as an advertisement to the message.

SUMMARY

In accordance with aspects of the present invention, there is provided a method and system according to the appended claims.

Embodiments of the invention are particularly convenient for use in enabling to route a message in a versatile way from a mobile terminal user of one mobile network to another mobile terminal user of another mobile network.

In accordance with further aspects of the invention, there is provided a method and system enabling to archive a message in a mobile network, which message has been sent from another mobile network.

Further features and advantages of the invention will become apparent from the following description of preferred embodiments of the aspects of the invention, given by way of example only, which is made with reference to the accompanying drawings. It is to be understood that other embodiments may be utilized, and structural and functional modifications may be made without departing from the scope and spirit of the present invention.

DETAILED DESCRIPTION OF THE INVENTION

In the following description of the various embodiments, reference is made to the accompanying drawings which form a part hereof, and in which is shown by way of illustration some of the embodiments in which the invention may be practiced. The exemplary embodiments presented in this text and their advantages relate by applicable parts to the method as well as the system according to the invention, even though this is not always separately mentioned.

The present invention relates to processing a message being delivered from one mobile network to another. The invention is applicable to various network technologies, such as second-generation (2G) and "second and a half"—generation (2.5 G) mobile networks based on time division multiple access (TDMA) technology, and third-generation (3G) networks based on code division multiple access (CDMA) and wideband code division multiple access (WCDMA) technologies. Some examples of suitable mobile networks are GSM (Global System for Mobile Communications), GPRS (General Packet Radio Service), EDGE (Enhanced Data rates for GSM Evolution) and UMTS (Universal Mobile Telecommunication System).

Some embodiments of the present invention enable modifying a message which has been received from a mobile terminal user of a mobile network and which message will be delivered to another mobile terminal user of another mobile network. Some embodiments of the present invention also enable storing a message in an archive, which can be accessed via an application program interface (API), and from which the message can be conveyed to a web service or a mobile terminal user.

Figure 1:
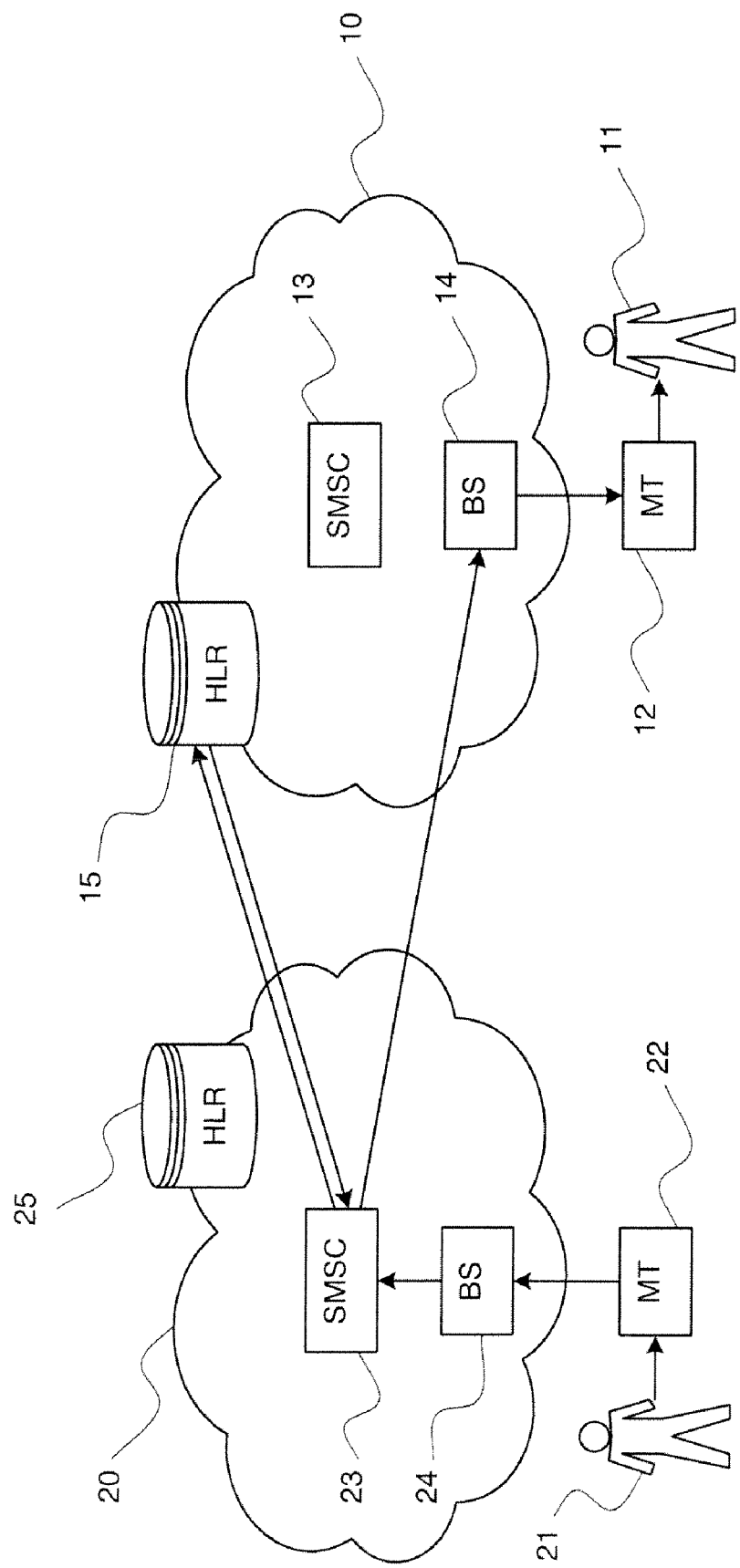
FIG. 1 shows a block diagram of a prior art communication system comprising mobile networks of different network operators.

FIG. 1 shows a block diagram of a prior art communication system comprising mobile networks of two network operators. In this exemplary illustration an SMS message is delivered from a subscriber of a mobile network to another subscriber of another mobile network. A subscriber 21 of a transmitting mobile network 20 sends the message by using a mobile terminal (MT) 22, such as a mobile phone. The message is first delivered to a short message service center (SMSC) 23 of the transmitting mobile network 20 via a base station (BS) 24. Then the SMSC 23 forwards the destination address of the message to a home location register (HLR) 15 of the receiving mobile network 10. The HLR 15 maintains location information and service profiles of the subscribers 11 of the receiving mobile network 10. The HLR 15 returns routing instructions to the SMSC 23 and then, according to the instructions, the message is delivered from the SMSC 23 of the transmitting mobile network 20 to a mobile terminal 12 of a recipient 11 via a base station 14 of the receiving mobile network 10.

When delivering the message, from the subscriber 21 to the subscriber 11, in the prior art communication system shown in FIG. 1, a HLR 25 of the transmitting mobile network 20 is not utilized. Respectively, an SMSC 13 of the receiving mobile network 10 is not used either, and in consequence of this the message cannot be stored, not even temporarily, in the receiving mobile network 10.

Figure 2:
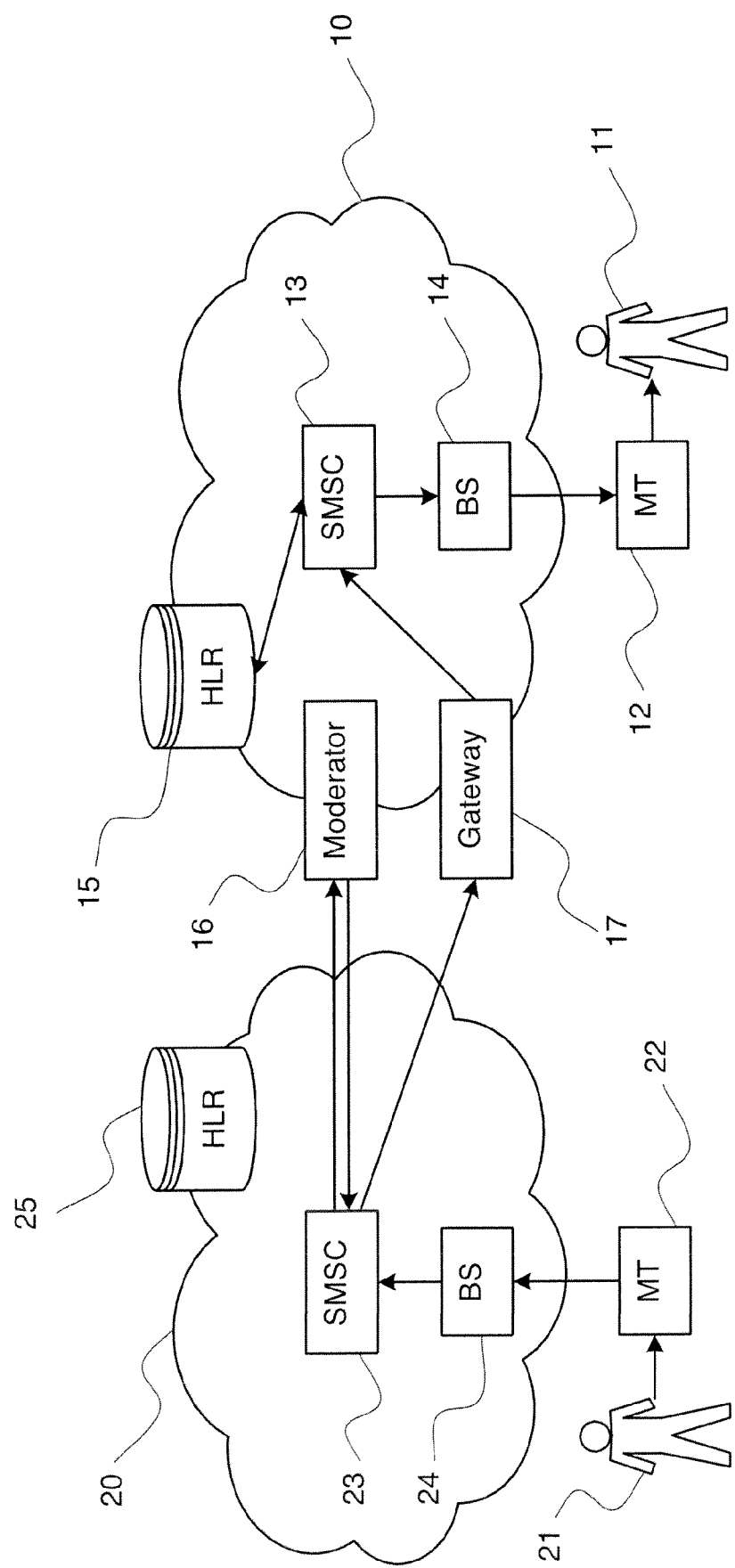
FIG. 2 shows a block diagram of a communication system according to an embodiment of the invention comprising mobile networks of different network operators.

FIG. 2 shows a block diagram of a communication system according to an embodiment of the invention. Instead of requesting routing instructions of the message from the HLR 15, the request is delivered to a moderator server 16 of the receiving mobile network 10. The moderator server 16 imitates operation of the HLR 15 to the SMSC 23 of the transmitting mobile network 20. The routing instructions of the message are generated at the moderator server 16. The routing instructions advise the SMSC 23 of the transmitting mobile network 20 to deliver the message to a gateway server 17 of the receiving mobile network 10. The gateway server 17 transmits the message to the SMSC 13, which then, by utilizing the information of the HLR 15, forwards the message to the mobile terminal 12 of the recipient 11 via the base station 14. By routing the message through the SMSC 13, instead of delivering the message directly to the base station 14, the message can be temporarily stored in the receiving mobile network 10.

By a server is meant a unit that provides some service to a system. A server can be implemented in hardware, software, or a combination of hardware and software. The moderator server 16 and gateway server 17 can be different units or one and the same unit.

The SMSC 13 and SMSC 23 represent examples of a store-and-forward center, which store-and-forward center is responsible for relaying, storing and forwarding a message. Typically, the store-and-forward center is an SMSC (Short Message Service Center) as shown in FIG. 2 or MMSC (Multimedia Messaging Service Center) designed to process SMS (Short Message Service) messages or MMS (Multimedia Messaging Service) messages, respectively. The request to send routing instructions typically comprises information of the recipient of the message. The information can include e.g. the destination address of the message, such as an MSISDN (Mobile Subscriber Integrated Services Digital Network).

In this exemplary illustration shown in FIG. 2 the message is an SMS message even though typically in this text by a message is meant an electronic data message suitable for being delivered in mobile networks from one subscriber to another. Some examples of a message are an SMS message, MMS message, electronic mail message, voice message, video message, picture message and text message. Besides including subject matter, a message can also comprise information regarding the sender and/or recipient of the message, e.g. sender's and/or recipient's MSISDN. Messages can be sent and received for example with mobile terminals 12, 22 such as a mobile phone or a PDA.

Figure 3:
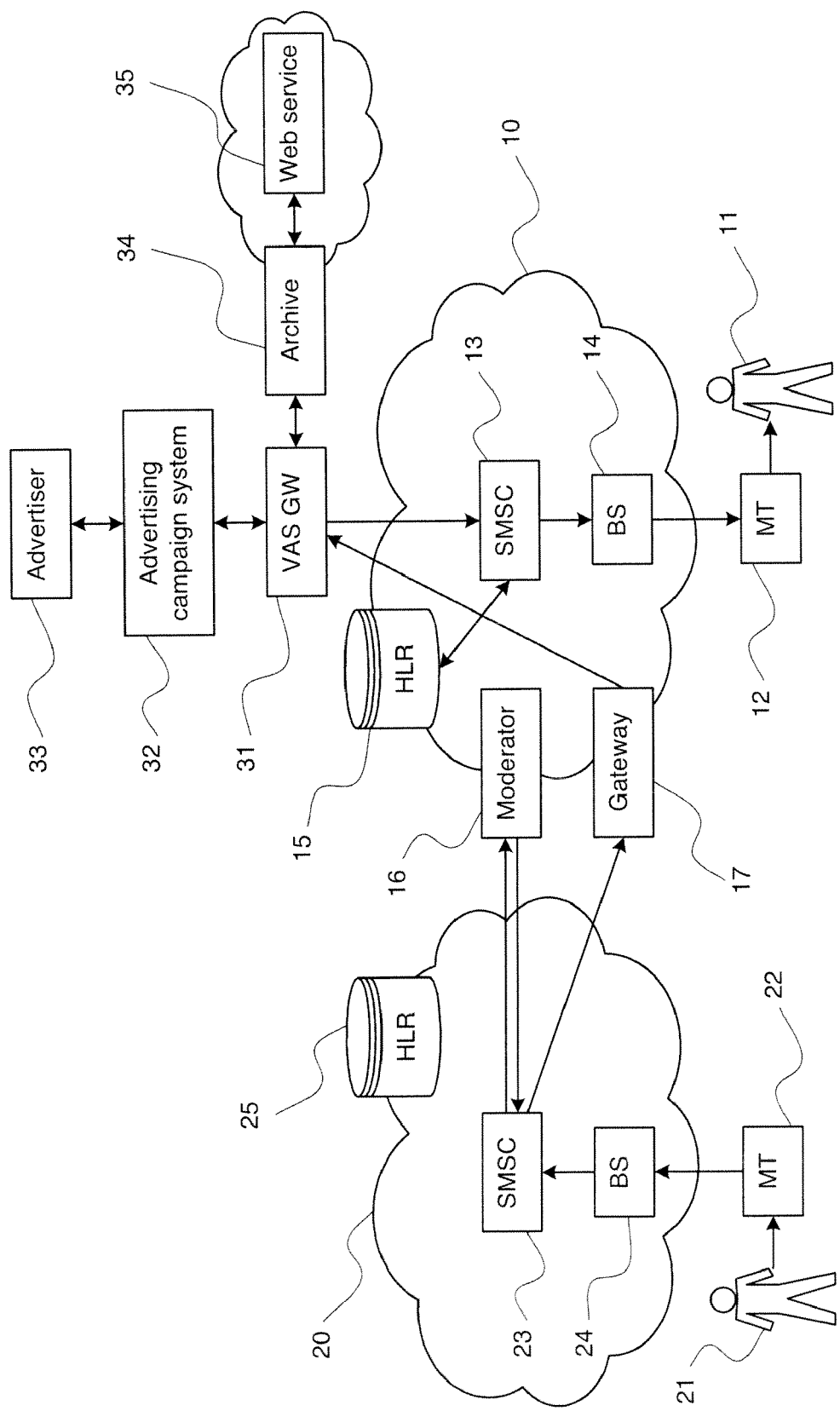
FIG. 3 shows a block diagram of a communication system according to an embodiment of the invention comprising mobile networks of different network operators.

FIG. 3 shows a block diagram of a communication system according to an embodiment of the invention. The routing instructions received from the moderator server 16 instruct the SMSC 23 to deliver the message to the gateway server 17. From the gateway server 17 the message can be delivered to a value-added service gateway (VAS GW) server 31 as shown in FIG. 3, or alternatively to the SMSC 13. Selecting the forwarding route can e.g. be based on subscriber information of a value-added service. The selecting can comprise reading recipient information included in the message, comparing said recipient information with subscriber information of the value-added service, and determining the forwarding route for the message based on whether the recipient of the message is a subscriber of the value-added service or not. The recipient information included in the message can be e.g. the recipient's MSISDN.

By a value-added service is meant a non-core telecommunication service. On a conceptual level, a value-added service adds value to the standard service offering, spurring subscribers of the mobile network to use their mobile phones more and allowing the network operator to drive up the average revenue per user. A value-added service can be provided either in-house by the network operator or by a third party value-added service provider. Subscriber information of a value-added service can comprise e.g. subscriber's MSISDN and information of subscribed service features. Subscriber information of a value-added service can be maintained e.g. on the gateway server 17.

At the VAS GW server 31 content of the message can be modified, for example by adding an advertisement to the message by utilizing subscriber information of the value-added service. Subscriber information can be maintained on the VAS GW server 31, and advertisements and campaign parameters can be maintained on an advertising campaign system 32.

The message can be modified by reading recipient information included in the message, selecting subscriber information of the value-added service corresponding to the recipient information, selecting an advertisement from the advertising campaign system 32 based on said subscriber information and campaign parameters, and adding said advertisement to the message. The recipient information included in the message can be e.g. the recipient's MSISDN.

An advertiser 33 or a third party uses the advertising campaign system 32 to design an advertising campaign. The advertiser 33 or third party typically defines campaign parameters, which set the rules of the advertising campaign, and inputs advertisements to the advertising campaign system 32. Campaign parameters define e.g. certain subscriber profiles i.e. one or more subscribers with similar properties. By an advertisement is meant electronic data that can be attached to the message and represented visually and/or acoustically to a consumer. An advertisement can comprise e.g. text, images, sounds, videos, html (hypertext markup language), xml (extensible markup language), tags, links.

An advertisement can be selected according to a set of rules as defined by the advertiser 33 or a third party operator. One of the rules by which an advertisement is selected for the message is based on the profile of the receiving mobile terminal 12. Alternatively the selection can be based on the profile of the sending mobile terminal 22. Since the profile of the sending mobile terminal 22 is typically known by the network operator of the transmitting mobile network 20, selection of the advertisement based on this information requires business agreements between the network operators. One type of an arrangement is a revenue share of the generated advertising revenues to cover a part or all of the termination cost to be paid by the network operator of the transmitting mobile network 20 in return of the profile information.

From the VAS GW server 31 a copy of the message with or without the advertisement can be forwarded to and then stored in an archive database 34. Forwarding a copy of the message to the archive database 34 may be conditional on activation of an archive service of the value-added service. In case the recipient of the message has activated the archive service, a copy of the message is conveyed to the archive database 34.

The archive database 34 enables long-term storing of the message. The archive database 34 can be implemented in such a database structure that the original message and added advertisement content are presented together or the advertisement related to the message can be changed periodically or randomly, or whenever certain parameters defining the modifying process of the message are updated. The advertisement can be changed e.g. when the profile of the recipient (subscriber information) changes or when an advertising campaign (advertisements, campaign parameters) defined in the advertising campaign system 32 changes. The VAS GW server 31 may be configured to change an advertisement.

An archive service is an optional feature of the value-added service. By an archive database 34 is meant an electronic database of archived messages. Archived messages can be accessed by the subscriber of the value-added service and if allowed by a third party for further processing purposes. Messages can be stored with or without an advertisement.

The archive database 34 can comprise an application program interface (API). By an application program interface is meant an interface (calling conventions) by which an application program accesses an operating system and other services. An access for a web service to the archive database 34 can be given through the API. The API can include a method for conveying the message to a web service such as a blog, personal or corporate web page, mobile Internet service, or wireless application protocol (WAP) service. The API may also include a method for altering the advertisement of the message in said implemented web service. By using the API the message can be downloaded to a web service server 35, which can be configured to present the message with or without the advertisement. The subscriber of the value-added service or the network operator can determine which messages are conveyed to the web service server 35 and published e.g. as blog entries. An advertisement related to the archived message or blog message can be the same, similar or different than once sent to the subscriber.

The archive database 34 can be configured to track the number of clicks or viewings of the advertisement included in the message and to generate statistics information. By generating statistics information based on the number of clicks or viewings of the advertisement, consumer benefits can be generated for the subscriber of the value-added service.

The advertisement included in the message in the archive database 34 or web service server 35 can include a "click-thru" type of functionality. "Click-thru" refers here to a concept where a ticket is issued to the advertising campaign system 32 for billing purposes if the recipient 11 or other user clicks on the message entry and/or related advertisement in the archive database 34 or web service server 35. The "click-thru" feature can be used to give subscriber benefits such as free or subsidized voice minutes, messaging services and/or data services in the mobile network by adjusting the balance of the subscriber's account (pre-paid or post-paid).

The arrangement can also be used e.g. to provide an easy mobile blog service by allocating a special number to which a message is sent and then published as a blog entry for the subscriber. The arrangement can include a possibility for the subscriber and the network operator to enter parameters and a set of rules according to which messages received and sent are published as blog entries and who can have access to those (privacy level).

To deliver the message to the recipient 11, the message is transmitted from the VAS GW server 31 to the SMSC 13 as shown in FIG. 3. The SMSC 13 determines location of the recipient 11 by communicating with the HLR 15. Then according to the location the message is delivered to the mobile terminal 12 of the recipient 11 via the base station 14. The advertisement related to the message can be different than the advertisement related to the message in the archive database 34 or web service server 35.

The HLR 15 represents an example of a subscriber location database which is an electronic database of permanent subscriber information for the mobile network, including address, account status, and preferences. The subscriber location database maintains e.g. details of SIM (Subscriber Identity Module) cards issued by the network operator. The subscriber location database also comprises location information and service profiles of the subscribers of the mobile network. The subscriber location database, which is maintained by the network operator, also manages the mobility of subscribers by means of updating their position.

The modifying and archiving arrangement of a message shown in FIG. 3 can also be used to provide services for a message sent from the mobile network 10 to the mobile network 20. Furthermore, the described arrangement is also suitable for processing a message sent and received within one mobile network 10.

Being computer-related, it can be appreciated that the components disclosed herein may be implemented in hardware, software, or a combination of hardware and software. Software components may be in the form of computer-readable program code stored in a computer-readable storage medium such as memory, mass storage device, or removable storage device. For example, a computer-readable medium may comprise computer-readable code for performing the function of a particular component. Likewise, computer memory may be configured to include one or more components, which may then be executed by a processor. Components may be implemented separately in multiple modules or together in a single module.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A method for processing inbound SMS messages to a first network from a second network, the method comprising:
   receiving, at a moderator server of the first mobile network,
      a request for a Home Location Register (HLR) of the first mobile network to send routing instructions for an inbound SMS message to a store-and-forward center of the second mobile network;

responding to the HLR request by transmitting, from the moderator server, the routing instructions which instruct the store-and-forward center of the second mobile network to route the inbound SMS message to a gateway server of the first mobile network regardless of recipient information included in the inbound SMS message;

transmitting the routing instructions from the moderator server to the store-and-forward center of the second mobile network;

receiving, at the gateway server of the first mobile network, the inbound SMS message from the store-and-forward center of the second mobile network, which inbound SMS message has been sent according to the routing instructions from the moderator server of the first mobile network;

selectively forwarding the inbound SMS message from the gateway server to a value-added service gateway server or to a store-and-forward center of the first mobile network based on a comparison between subscriber information for the value-added service and the recipient information included in the inbound SMS message; and if the inbound SMS message is selectively forwarded to the value-added service gateway, modifying content of the inbound SMS message at the value-added service gateway server prior to the value-added service gateway server directly transmitting the inbound SMS message including the modified content to the store-and-forward center of the first mobile network, wherein, the store-and-forward center of the first mobile network makes a new HLR query after the store-and-forward center of the first mobile network receives the inbound SMS message from the gateway server of the first mobile network or receives the inbound SMS message with modified content from the value-added service gateway and delivers the received inbound SMS message based on routing instructions received in response to the new HLR query.

2. The method of claim 1, wherein the modifying of the content of the inbound SMS message is performed by:
reading the recipient information included in the inbound SMS message;
selecting the subscriber information of a value-added service corresponding to the recipient information;
selecting an advertisement from an advertising campaign system, which selecting is based on campaign parameters and the subscriber information; and
adding the advertisement to the SMS message.

3. The method of claim 1, further comprising:
forwarding a copy of the inbound SMS message to an archive database; and
storing the copy of the inbound SMS message in the archive database.

4. The method of claim 3, in which the forwarding a copy of the inbound SMS message to an archive database, and storing the inbound SMS message in the archive database is performed if the recipient of the inbound SMS message has activated an archive service of the value-added service.

5. The method of claim 3, further comprising:
updating advertisements maintained on the advertising campaign system; and
modifying the content of the inbound SMS message based on the updated advertisements.

6. The method of claim 3, further comprises updating campaign parameters maintained on the advertising campaign system, wherein the modifying of the content of the inbound SMS message is based on updated campaign parameters.

7. The method of claim 3, further comprises updating subscriber information of the value-added service maintained on the value-added service gateway server, wherein the modifying of the content of the inbound SMS message is based on the updated subscriber information.

8. The method of claim 3, further comprising:
giving, for a web service, an access to the archive database through an application program interface; and
conveying the inbound SMS message from the archive database to the web service server through the application program interface.

9. The method of claim 8, further comprising:
presenting the inbound SMS message by using the web service;
tracking a number of clicks or viewings of the advertisement included in the inbound SMS message; and
generating statistics information based on the number of clicks or viewings of the advertisement.

10. The method of claim 1, further comprising:
receiving the inbound SMS message, with or without included modified content, at the store-and-forward center of the first mobile network;
determining a location of the recipient by communicating with a subscriber location database of the first mobile network, which subscriber location database maintains location information of subscribers of the first mobile network;
selecting a base station of the first mobile network based on the location of the recipient; and
delivering the inbound SMS message, with or without included modified content, through the base station to the recipient.

11. The method of claim 10, in which the store-and-forward center of the first mobile network is a Short Message Service Center (SMSC).

12. The method of claim 10, in which the subscriber location database is the HLR of the first mobile network.

13. A system for processing inbound SMS messages to a first network from a second network, the system comprising:
a moderator server of a first mobile network configured to receive a request for a Home Location Register (HLR) of the first mobile network to send routing instructions for an inbound SMS message to a store-and-forward center of the second mobile network, the moderator server being further configured to both:
respond to the HLR request by transmitting, from the moderator server, the routing instructions which instruct the store-and-forward center of the second mobile network to route the inbound SMS message to a gateway server of the first mobile network regardless of recipient information included in the inbound SMS message, and
transmit the routing instructions to the store-and-forward center of the second mobile network, wherein the system further comprises
the gateway server of the first mobile network, the gateway server being configured to receive the inbound SMS message from the store-and-forward center of the second mobile network, which inbound SMS message has been sent according to the routing instructions from the moderator server of the first mobile network; and
a value-added service gateway server configured to modify content of the inbound SMS message prior to the value-added service gateway server directly transmitting the inbound SMS message including the modified content to the store-and-forward center of the first mobile network, wherein the gateway server is configured to selectively forward the inbound SMS message to the value-added service gateway server or to a store-and-forward center of the first mobile network based on a comparison between subscriber information for the value-added service and the recipient information included in the inbound SMS message, and wherein, the store-and-forward center of the first mobile network is configured to make a new HLR query after the store-and-forward center of the first mobile network receives the inbound message from the gateway server or receives the inbound message SMS message with modified content from the value-added service gateway and delivers the received inbound SMS message based on routing instructions received in response to the new HLR query.

14. The system of claim 13, further comprising an advertising campaign system configured to maintain advertisements and campaign parameters, and wherein the value-added service gateway server is configured to read the recipient information included in the inbound SMS message, to select the subscriber information of a value-added service corresponding to the recipient information, which subscriber information is maintained on the value-added service gateway server, to select an advertisement from the advertising campaign system, which selecting is based on the subscriber information and campaign parameters, and to add the advertisement to the inbound SMS message.

15. The system of claim 13, further comprising an archive database configured to store the inbound SMS message, and wherein the value-added service gateway server is configured to forward a copy of the inbound SMS message to the archive database.

16. The system of claim 13, wherein the value-added service gateway server is configured to modify the content of the inbound SMS message based on updated advertisements.

17. The system of claim 13, wherein the value-added service gateway server is configured to modify the content of the inbound SMS message based on updated campaign parameters.

18. The system of claim 13, wherein the value-added service gateway server is configured to modify the content of the inbound SMS message based on the updated subscriber information.

19. The system of claim 15, wherein the archive database comprises an application program interface configured to give an access for a web service to the archive database, and to convey the inbound SMS message to the web service.

20. The system of claim 19, wherein the archive database is configured to track a number of clicks or viewings of the advertisement included in the inbound SMS message and presented in the web service, and to generate statistics information based on the number of clicks or viewings of the advertisement.

21. The system of claim 13, further comprising a store-and-forward center of the first mobile network configured to receive the inbound SMS message.

22. The system of claim 21, wherein the store-and-forward center of the first mobile network is a Short Message Service Center (SMSC).

23. The system of claim 13, further comprising a subscriber location database of the first mobile network configured to maintain location information of subscribers of the first mobile network.

24. The system of claim 23, wherein the subscriber location database is the HLR of the first mobile network.

25. The system of claim 23, wherein the store-and-forward center of the first mobile network is configured to determine a location of the recipient by communicating with the subscriber location database, and to deliver the inbound SMS message, with or without modified content, to the recipient.

26. The system of claim 13, in which the store-and-forward center of the first mobile network is a Short Message Service Center.

27. The method of claim 1, in which if the recipient is not a subscriber of the value-added service, the inbound SMS message is forwarded from the gateway server to the store-and-forward center of the first mobile network.

28. The method of claim 1, further comprising forwarding the inbound SMS message with modified content from the value-added service gateway sever to a Short Message Service Center (SMSC) of the first mobile network.

29. The method of claim 28, wherein the SMSC of the first network queries the HLR of the first mobile network to determine the inbound SMS message recipient's location.

30. The method of claim 1, wherein the inbound SMS message is forwarded from the gateway server of the first network to the value-added service gateway server based on subscriber identity of a recipient of the inbound SMS message.

31. The system of claim 13, wherein the gateway server is configured to forward the inbound SMS message to the value-added service gateway server based on subscriber identity of a recipient of the inbound SMS message.

32. The method of claim 1, wherein the inbound SMS message is selectively forwarded from the gateway server to the value-added service gateway server if the intended recipient of the inbound SMS message has subscribed to a Value Added Service but is directly forwarded to the store-and-forward center of the first mobile network if the intended recipient has not subscribed to the Value Added Service.

33. The system of claim 13, wherein the gateway server is configured to selectively forward the inbound SMS message to the value-added service gateway server if the intended recipient of the inbound SMS message has subscribed to a Value Added Service but is directly forwarded to the store-and-forward center of the first mobile network if the intended recipient has not subscribed to the Value Added Service.

* * * * *